United States Patent
Volmer

(10) Patent No.: US 11,608,816 B2
(45) Date of Patent: Mar. 21, 2023

(54) NACELLE FOR A WIND TURBINE

(71) Applicant: General Electric Renovables Espana, S.L., Barcelona (ES)

(72) Inventor: Matthias Volmer, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/511,796

(22) Filed: Oct. 27, 2021

(65) Prior Publication Data
US 2022/0128037 A1 Apr. 28, 2022

(30) Foreign Application Priority Data

Oct. 28, 2020 (EP) .................................. 20204397

(51) Int. Cl.
*F03D 80/80* (2016.01)

(52) U.S. Cl.
CPC .......... *F03D 80/88* (2016.05); *F05B 2240/14* (2013.01)

(58) Field of Classification Search
CPC .............................. F03D 80/88; F05B 2240/14
See application file for complete search history.

(56) References Cited

U.S. PATENT DOCUMENTS

| 5,810,558 | A | * | 9/1998 | Streeter | ................. | F16M 7/00 |
| | | | | | | 415/213.1 |
| 8,632,437 | B2 | * | 1/2014 | Dinter | ................. | F16H 57/025 |
| | | | | | | 475/347 |
| 10,495,210 | B2 | * | 12/2019 | Hasan | ................. | F03D 15/00 |
| 11,255,313 | B2 | * | 2/2022 | Wertz | ................. | F03D 13/40 |
| 2012/0056071 | A1 | | 3/2012 | Michalski | | |
| 2012/0076652 | A1 | * | 3/2012 | Ventzke | ................. | F16F 9/53 |
| | | | | | | 416/61 |
| 2013/0095972 | A1 | | 4/2013 | Dinter et al. | | |

FOREIGN PATENT DOCUMENTS

| EP | 1197677 A2 | 4/2002 |
| EP | 2434154 A1 | 3/2012 |
| EP | 3394429 A1 | 10/2018 |

OTHER PUBLICATIONS

European Search Report Corresponding to EP20204397 dated Apr. 14, 2021.

* cited by examiner

*Primary Examiner* — David E Sosnowski
*Assistant Examiner* — Jason G Davis
(74) *Attorney, Agent, or Firm* — Dority & Manning, P.A.

(57) ABSTRACT

A nacelle for a wind turbine, the nacelle comprising: a drivetrain with a drivetrain axis, at least two torque arms positioned around the drivetrain axis and attached to a member of the drivetrain, and a frame attached to a yaw bearing. The torque arms of the drive train are supported by the frame and at least one of the torque arms has an orientation deviating at least substantially from being horizontal.

12 Claims, 4 Drawing Sheets

-Prior Art-

-Prior Art-

NACELLE FOR A WIND TURBINE

FIELD

The present subject matter relates generally to wind turbines, and more particularly to a nacelle for a wind turbine including at least two torque arms fixedly attached to a member of a drivetrain of the nacelle.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Typically, the nacelle includes torque arms for transferring forces to support a torque of the wind turbine. The torque arms are attached to a member of the drive train, for example to the gear box. Torque arms can reduce the space available for walkways, egress routes and material handling within the nacelle. This may result in nacelles having a large volume, particularly having a large width or height.

Accordingly, the present disclosure is directed to nacelle for a wind turbine including at least two torque arms fixedly attached to a member of a drivetrain of the nacelle.

BRIEF DESCRIPTION

Aspects and advantages of the invention will be set forth in part in the following description, or may be obvious from the description, or may be learned through practice of the invention.

In one aspect, the present disclosure is directed to a nacelle for a wind turbine. The nacelle includes: a drivetrain with a drivetrain axis, at least two torque arms positioned around the drivetrain axis and attached to a member of the drivetrain, and a frame attached to a yaw bearing. The torque arms of the drive train are supported by the frame and at least one of the torque arms has an orientation deviating at least substantially from being horizontal. In typical embodiments, the torque arms are supported by the frame using vibration dampers. It should be understood that the nacelle may further include any of the additional features as described herein.

In another aspect, the present disclosure is directed to a method of supporting a torque in a nacelle of a wind turbine having a drivetrain with a drivetrain axis. The method includes: providing at least two torque arms positioned around the drivetrain axis and attached to a member of the drivetrain and providing a frame attached to a yaw bearing. The torque arms of the drive train are supported by the frame and at least one of the torque arms has an orientation deviating at least substantially from being horizontal. It should be understood that the method may further include any of the additional steps and/or features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
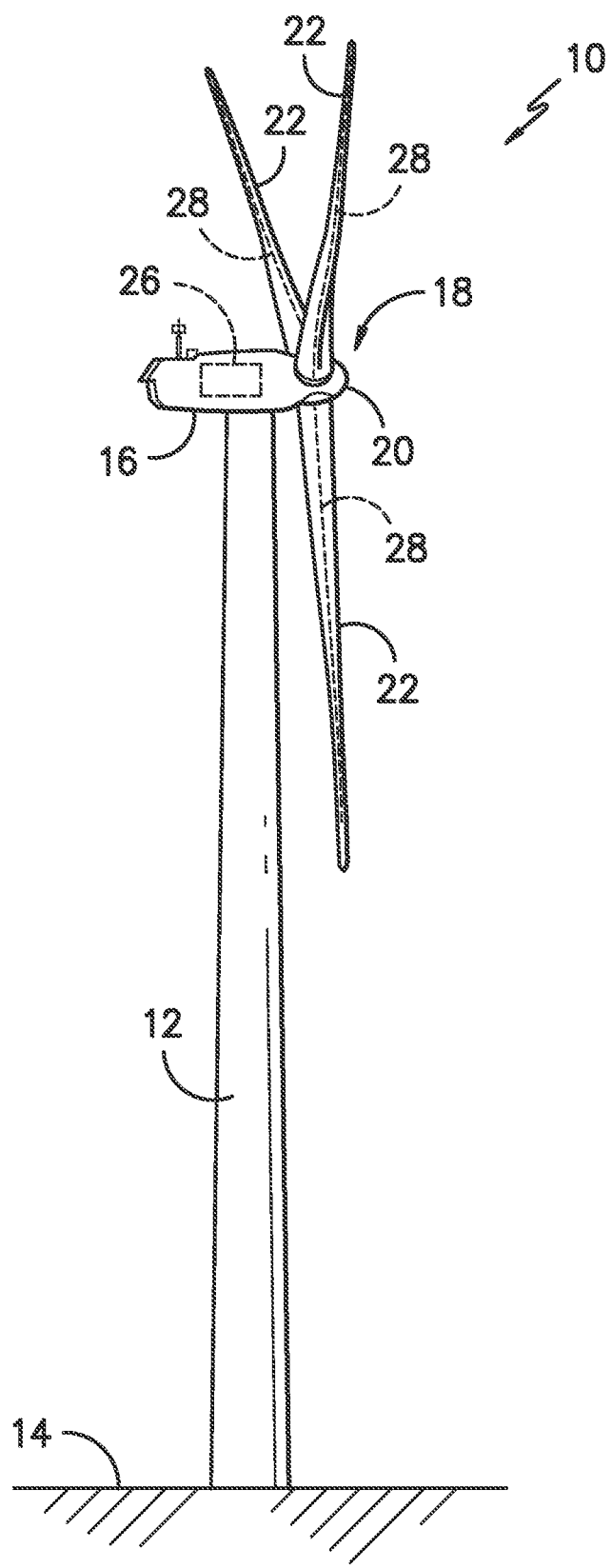
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a wind turbine 10. As shown, the wind turbine 10 generally includes a tower 12 extending from a support surface 14, a nacelle 16 mounted on the tower 12, and a rotor 18 coupled to the nacelle 16. Thus, the nacelle 16 corresponds to the overall housing structure and has a bottom wall, opposing side walls, a front wall, a rear wall, and a top wall. Further, the front wall may have a main shaft opening configured to receive a main shaft 34 (FIG. 2) there through that is connectable to the rotor 18.

As shown in FIG. 1, the rotor 18 includes a rotatable hub 20 and at least one rotor blade 22 coupled to and extending outwardly from the hub 20. For example, in FIG. 1, the rotor 18 includes three rotor blades 22. However, in alternative wind turbines, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other wind turbines, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several wind turbines, the controller 26 may include suitable computer-readable instructions that, when implemented, configure the controller 26 to perform various different functions, such as receiving, transmitting and/or executing wind turbine control signals.

Figure 2:
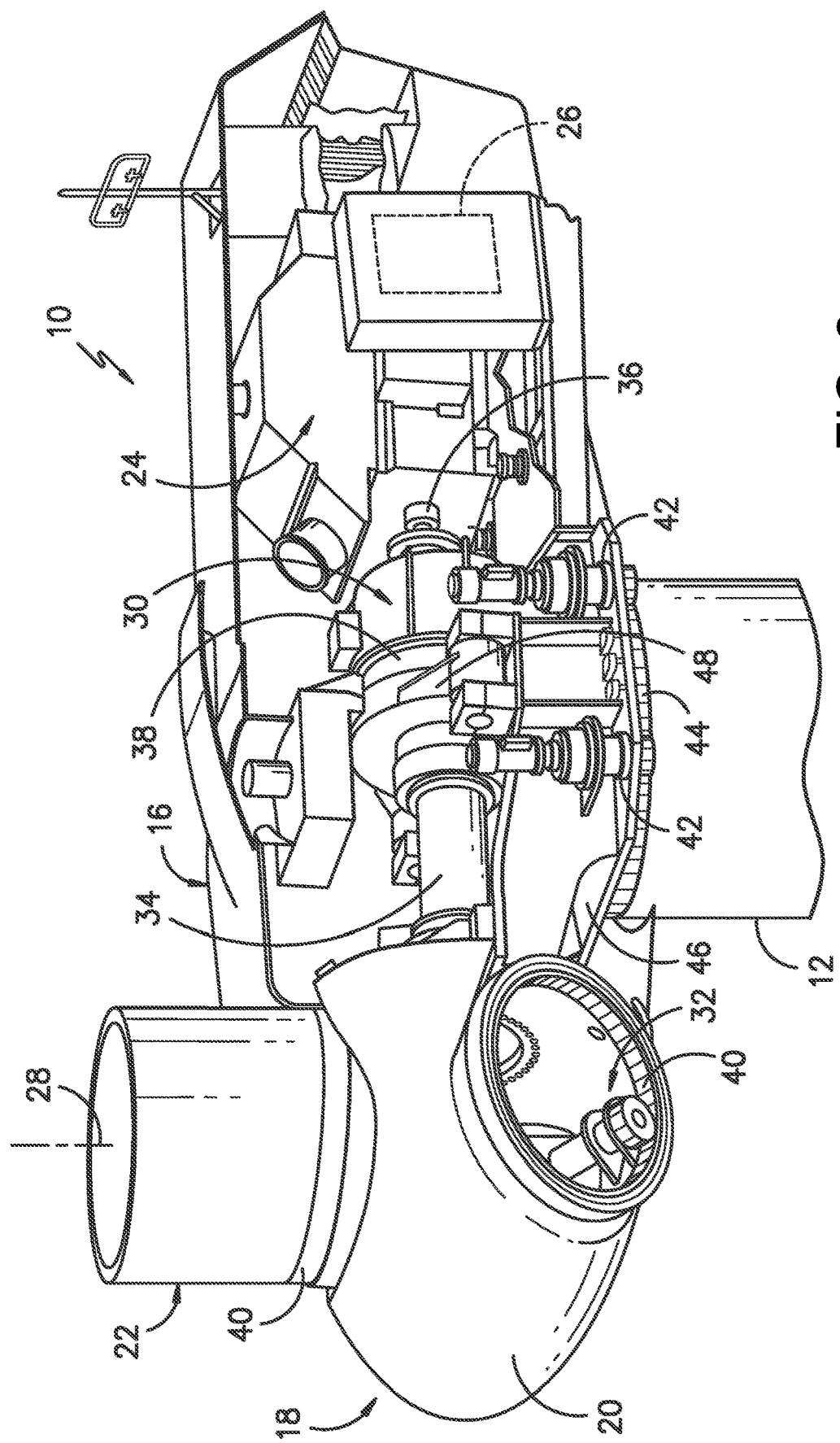
FIG. 2 illustrates a simplified, internal view of a nacelle of a wind turbine, particularly illustrating the nacelle during normal operation.

Referring now to FIG. 2, a simplified, internal view of an exemplary nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain wind turbines, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

In some embodiments, the wind turbine may be an onshore wind turbine. In several embodiments, the wind turbine may be an offshore wind turbine.

In some embodiments, a component of a wind turbine can include a mechanical, electrical or electromechanical device, in particular associated with energy production or conversion. In embodiments, a component can include at least one of a drivetrain, a drivetrain component and a transformer. In particular, a drivetrain component may include a gearbox, a main shaft, a main bearing and/or a generator.

In some embodiments, a nacelle may include a base coupled to a tower of the wind turbine. The base can include a bedplate and/or at least a part of the bottom wall of the nacelle. In some embodiments, the roof can be configured for mounting to a base of the nacelle, in particular using a releasable connecting device, e. g. by positive locking of the roof and the base or via a fastener such as a bolt.

Figure 3A:
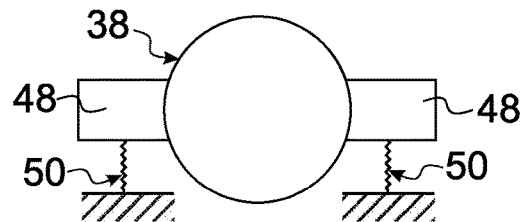
FIGS. 3A-B each illustrate a schematic view of a part of a nacelle according to the prior art.
Figure 3B:
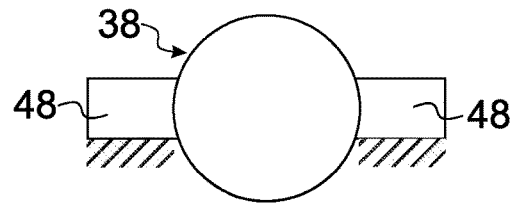

FIGS. 3A-B each illustrate a schematic view of a part of a nacelle according to the prior art. For clarity, only torque arms 48 and a gearbox 38 are shown. The remaining configuration of the nacelle may be for example as described above with regard to FIG. 2.

In FIG. 3A, the torque arms 48 are attached directly to the gearbox 38. The torque arms 48 are supported by a frame of the nacelle via elastomers 50. In particular, an elastomer 50 is arranged between each of the torque arms and the frame.

In FIG. 3B, elastomers (not shown) are arranged between the torque arms 48 and the gearbox 38 as vibration dampers. In this example, the torque arms are supported directly by the frame. The use of vibration dampers between the frame and the torque arm is typically also understood as being a direct support. In FIGS. 3A-B, support regions are indicated by hatched areas.

As can be seen, the orientation of the torque arms 48 in FIGS. 3A-B is at least substantially horizontal. In particular, the torque arms 48 are positioned symmetrically around a drive train axis of the nacelle. More particularly, a symmetry plane is oriented vertically and parallel to the drive train axis. In the context of the present disclosure, a horizontal orientation is particularly to be understood with respect to a mounted state of the nacelle. In a mounted state, the nacelle may be mounted on a tower, the tower extending from a support surface. A horizontal orientation may be understood as an orientation perpendicular to a tower axis, particularly to a main direction of extension of the tower. The horizontal orientation can be parallel to the support surface.

FIGS. 4A-E each illustrate a schematic view of a part of a nacelle according to embodiments of the present disclosure. For clarity, only torque arms 48 and a component of the drivetrain are shown. In the depicted embodiments, the component of the drivetrain is a gearbox 38. As to the remaining configuration of the nacelle, for example the description above regarding FIG. 2 may be referred to.

A nacelle for a wind turbine according to the present disclosure includes a drivetrain with a drivetrain axis. The nacelle further includes at least two torque arms positioned around the drivetrain axis. In the embodiments shown in FIGS. 4A-E, the nacelle includes two torque arms 48. The torque arms 48 are attached to a member of the drivetrain, particularly to the gearbox 38. Generally, the member of the drivetrain can be for example a gearbox or a generator. The torque arms may be fixedly attached to the member of the drive train.

A gearbox axis may coincide with the drivetrain axis. In particular, the gearbox axis coincides with an axis of an input shaft of the gearbox. The input shaft is particularly a low speed shaft. More particularly, the low speed shaft is connected to a hub of the nacelle. In the exemplary embodiments shown in FIGS. 4A-E, the torque arms are oriented perpendicularly to the drivetrain axis.

In the context of the present disclosure, an orientation of a torque arm is particularly to be understood as a direction parallel to a line connecting the drivetrain axis with a point, particularly an idealized point, of structural support of the torque arm. The nacelle further includes a frame attached to a yaw bearing. The torque arms 48 of the drive train are supported by the frame. In FIGS. 4A-D, support regions are indicated by hatched areas.

At least one of the torque arms has an orientation deviating at least substantially from being horizontal. An advantage of the orientation deviating at least substantially from being horizontal is that an amount of space available next to the drivetrain may be increased. In particular, space available for example for walkways, egress routes or material handling may be larger. Additionally or alternatively, the nacelle may be built smaller, particularly narrower, as compared to a conventional nacelle. A nacelle according to the present disclosure may also have a reduced height compared to a conventional nacelle.

Logistic requirements, particularly regarding a transport of the nacelle, may be reduced. Furthermore, efforts regarding an installation in the field may be lowered. An efficiency of material utilization may be increased. Moreover, a size, particularly a transport dimension, of the drivetrain itself can be reduced. This may be particularly beneficial in case the drivetrain is to be transported separately from the nacelle.

As can be seen in the conventional design shown in FIGS. 3A-B, space next to the drivetrain is blocked by the torque arms 48. Compared to this, for example in the nacelle according to the present disclosure shown in FIG. 4A, blocking of space next to the drivetrain by the torque arm 48 depicted on the left side is reduced or eliminated. The free space next to the drivetrain may be used for example for walkways, egress routes or material handling. Accordingly, the width or the height of the nacelle can potentially be reduced, since space above the drive train or next to the torque arms is not needed for this purpose. In particular, technicians and material can pass the drivetrain or a component of the drivetrain next to it, instead of above it. In this regard, a component of the drivetrain may be for example a gearbox, a gearbox support structure, or a generator.

In other words, the design of the torque arms is driven at least mainly by space requirements or load paths and not symmetry considerations. Generally, loads occurring during an operation of the wind turbine are not necessarily symmetrical. The respective loads on the torque arms are not necessarily equal. In particular, loads from a torque may differ with respect to a direction of rotation of the wind turbine.

Figure 4A:
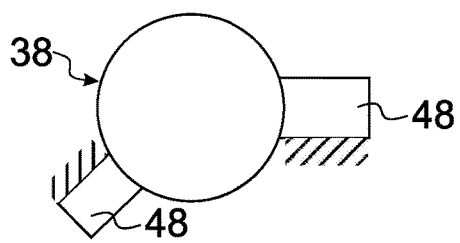
FIGS. 4A-E each illustrate a schematic view of a part of a nacelle according to embodiments of the present disclosure.

In embodiments, for example as shown in FIG. 4A, two of the torque arms deviate at least substantially from being parallel to each other. The angle between the two torque arms may be smaller than for example 175°, 160°, or 145°.

In embodiments, at least one of the torque arms has an orientation deviating from being horizontal by an angle of at least 10°. The orientation may deviate from being horizontal by an angle of at least for example 5, 15, or 25°. In the context of the present disclosure, an orientation deviating at least substantially from being horizontal may be understood as deviating from being horizontal by an angle of at least 10°.

Figure 4B:
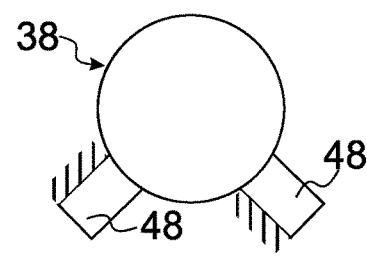

In embodiments, for example as shown in FIG. 4B, two torque arms 48 may have an orientation deviating at least substantially from being horizontal. The space savings in the nacelle as described above may be further increased.

In embodiments, the shapes of the torque arms may differ from each other, particularly depending on the load. The shapes of the torque arms may be based on a direction of rotation of the wind turbine in an operating state. In particular, the shapes of the torque arms may be chosen in view of size and load requirements, while at least mostly disregarding symmetry considerations.

In embodiments, the nacelle may include at least three torque arms. For example, the nacelle may include three, four or five torque arms. In particular, the number of the torque arms may be chosen in view of size and load requirements, while at least mostly disregarding symmetry considerations.

Figure 4C:
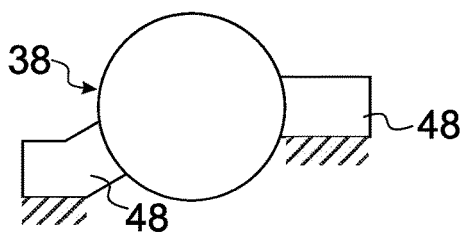
Figure 4D:
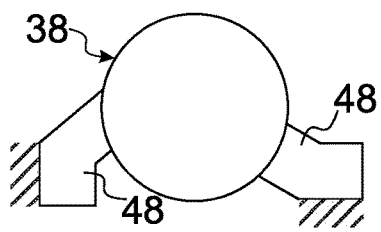

In embodiments, for example as shown in FIGS. 4C-4D, at least one of the torque arms is non-linear. In particular, at least one of the torque arms includes a first section extending from the member along a first direction and a second section continuing from the first section along a second direction. In other words, at least one of the torque arms may for example have at least one kink or may be curved. An angle between the first and the second direction may be larger than for example 10, 15, or 20°. Space utilization or load path distribution may be further optimized.

In embodiments, for example as shown in FIG. 4A, at least one of the torque arms is supported by the frame from underneath. A support from underneath is particularly to be understood with respect to a mounted state of the nacelle. In a mounted state, the nacelle may be mounted on a tower, the tower extending from a support surface. More particularly, a support from underneath may be understood as the torque arm being supported from a side facing the tower or the support surface. In FIG. 4A, the torque arm 48 depicted on the right is supported from underneath.

In embodiments, at least one of the torque arms is supported by the frame from above. A support from above may be understood as the torque arm being supported from a side opposite a side facing the tower or the support surface of the tower.

Figure 4E:
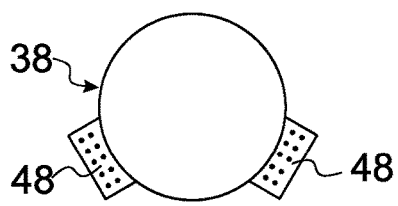

In embodiments, for example as shown in FIGS. 4D-4E, at least one of the torque arms is supported in at least one of a lateral direction and a longitudinal direction with respect to the drivetrain axis. In the embodiment shown in FIG. 4D, the torque arm 48 depicted on the left is supported from a lateral direction with respect to the drivetrain axis. In the embodiment shown in FIG. 4E, both depicted torque arms 48 are supported from a longitudinal direction with respect to the drivetrain axis. A support in the longitudinal direction can be provided for example via bolts inserted into the holes indicated on the torque arms 48 depicted in FIG. 4E.

Figure 5:
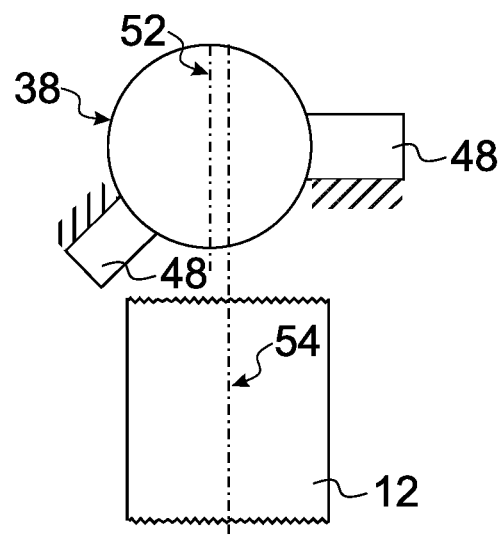
FIG. 5 illustrates a schematic view of a part of a nacelle according to embodiments of the present disclosure.

FIG. 5 illustrates a schematic view of a part of a nacelle according to embodiments of the present disclosure. Further, a section of a tower 12 of the wind turbine, including a yaw axis 54, is shown. In the depicted embodiment, a central axis 52 of the nacelle intersects the drivetrain axis and runs parallel to the yaw axis 54.

In embodiments, as shown in FIG. 5, the nacelle is configured such that in a mounted state, a distance between the drivetrain axis and a yaw axis 54 is larger than 1 cm. The distance between the drivetrain axis and the yaw axis may be larger than for example 1, 2, 4, or 8 cm. Providing a distance between the drivetrain axis and the yaw axis may improve load distribution or space utilization in the nacelle.

In embodiments, a main axis of a first torque arm 48 crosses a main axis of a second torque arm 48 in a point having a distance from the yaw axis 54 larger than 1, 2, 4, or 8 cm.

Figure 6:
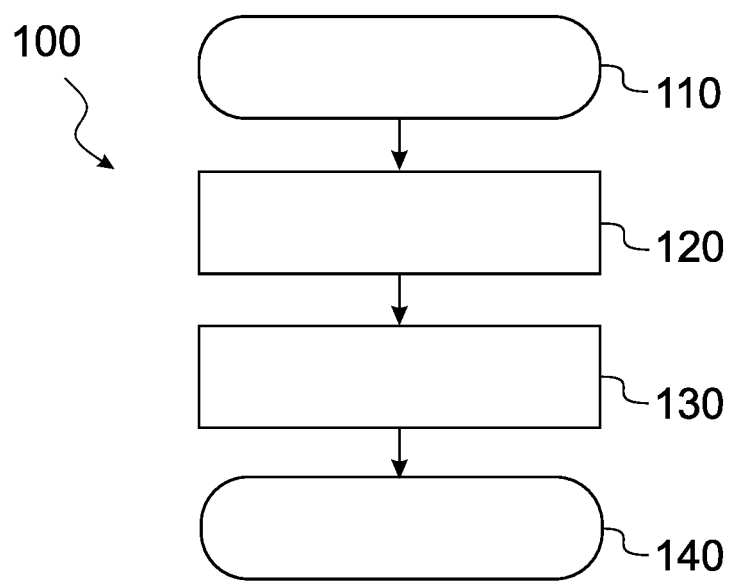
FIG. 6 illustrates a flow diagram of an embodiment of a method of supporting a torque in a nacelle of a wind turbine according to the present disclosure.

FIG. 6 illustrates a flow diagram of an embodiment of a method of supporting a torque in a nacelle of a wind turbine according to the present disclosure. The method 100 of supporting a torque in a nacelle of a wind turbine having a drivetrain with a drivetrain axis starts in block 110. The method includes, in block 120, providing at least two torque arms positioned around the drivetrain axis and attached to a member of the drivetrain. The torque arms may be fixedly attached to a member of the drivetrain.

The method further includes, in block 130, providing a frame attached to a yaw bearing, wherein the torque arms of the drive train are supported by the frame. At least one of the torque arms has an orientation deviating at least substantially from being horizontal. The method concludes in block 140.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A nacelle for a wind turbine, the nacelle comprising:
a drivetrain with a drivetrain axis;
at least two torque arms positioned around the drivetrain axis and attached to a member of the drivetrain;
a frame attached to a yaw bearing, the yaw bearing having a yaw axis, wherein
the torque arms of the drive train are supported by the frame and wherein at least one of the torque arms has an orientation deviating from being horizontal; and
a lateral distance between the drivetrain axis and the yaw axis measured in a plane perpendicular to a longitudinal axis of the nacelle is greater than 1 cm.

2. The nacelle of claim 1, wherein at least one of the torque arms has an orientation deviating from being horizontal by an angle of at least 10°.

3. The nacelle of claim 1, wherein two of the torque arms deviate from being parallel to each other.

4. The nacelle of claim 1, wherein at least one of the torque arms is non-linear.

5. The nacelle of claim 1, wherein at least one of the torque arms includes a first section extending from the member along a first direction and a second section continuing from the first section along a second direction, wherein an angle between the first and the second direction is larger than 10°.

6. The nacelle of claim 1, wherein at least one of the torque arms is supported in at least one of a lateral direction or a longitudinal direction with respect to the drivetrain axis.

7. A method of supporting a torque generated in a nacelle of a wind turbine having a drivetrain with a drivetrain axis, the method including:
providing at least two torque arms positioned around the drivetrain axis and attached to a member of the drivetrain;
providing a frame attached to a yaw bearing, the yaw bearing having a yaw axis, wherein the torque arms of the drive train are supported by the frame and wherein at least one of the torque arms has an orientation deviating at least substantially from being horizontal; and
wherein a lateral distance between the drivetrain axis and the yaw axis measured in a plane perpendicular to a longitudinal axis of the nacelle is greater than 1 cm.

8. The method of claim 7, wherein at least one of the torque arms has an orientation deviating from being horizontal by an angle of at least 10°.

9. The method of claim 7, wherein two of the torque arms deviate from being parallel to each other.

10. The method of claim 7, wherein at least one of the torque arms includes a first section extending from the member along a first direction and a second section continuing from the first section along a second direction, wherein an angle between the first and the second direction is larger than 10°.

11. The method of claim 7, wherein at least one of the torque arms is supported by the frame from underneath.

12. The method of claim 7, wherein at least one of the torque arms is supported in at least one of a lateral direction or a longitudinal direction with respect to the drivetrain axis.

* * * * *